United States Patent
Desrosiers et al.

(10) Patent No.: US 6,674,811 B1
(45) Date of Patent: Jan. 6, 2004

(54) EFFICIENT PRE-DISTORTED 12/4 QAM MODULATOR

(75) Inventors: Ryan M. Desrosiers, Tigard, OR (US); Craig A. Hornbuckle, Torrance, CA (US); Harvey L. Berger, Bedondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 631 days.

(21) Appl. No.: 09/593,328

(22) Filed: Jun. 14, 2000

(51) Int. Cl.[7] .............................................. H04L 27/36
(52) U.S. Cl. ..................... 375/298; 375/296; 375/261; 375/308; 332/103
(58) Field of Search ................................ 375/295, 298, 375/261, 308, 279, 296; 332/103

(56) References Cited

U.S. PATENT DOCUMENTS 4,571,549 A * 2/1986 Lods et al. ................. 332/16 R
5,237,292 A * 8/1993 Chethik ...................... 332/103

* cited by examiner

Primary Examiner—Temesghen Ghebretinsae
(74) Attorney, Agent, or Firm—Tarolli, Sundheim, Covell & Tummino L.L.P.

(57) ABSTRACT

Methods and devices for predistorted 12/4 Quadrature Amplitude Modulation that compensate for distortion from a nonlinear element. Modulator input bits are mapped (40) to a plurality of nonreturn-to-zero (NRZ) modulator control bit (20–30). The mapping is determined by desired points on a 12/4 QAM constellation. At least one phase shift device (4, 6) receives an input signal and at least one of the plurality of modulator control bit. At least two quaternary phase shift keying (QPSK) devices (8, 10) receive phase shifted signals from at least one phase shift device. Each of at least two QPSK devices receives at least one of the plurality of NRZ symbols. An attenuator (32) that attenuates a first QPSK signal outputted from a first QPSK device of the at least two QPSK devices. A summer (34) sums the attenuated first QPSK signal with a second QPSK signal. The second QPSK signal is outputted from a second QPSK device of the two QPSK devices. The summer outputs a predistorted 12/4-QAM signal. The plurality of modulator control bit control the at least one phase shift devices and the two QPSK modulators to achieve the desired points on the 12/4 QAM constellation.

34 Claims, 6 Drawing Sheets

The elements A, B, and C can occur in any order

The elements A, B, and C can occur in any order

| MSB | 3SB | 2SB | 1SB | D1 | D2 | D3 | D4 | D5 | D6 |
|---|---|---|---|---|---|---|---|---|---|
| -1 | -1 | -1 | -1 | -1 | -1 | -1 | -1 | -1 | -1 |
| -1 | -1 | -1 | 1 | -1 | 1 | -1 | 1 | 1 | 1 |
| -1 | -1 | 1 | -1 | -1 | -1 | -1 | -1 | -1 | 1 |
| -1 | -1 | 1 | 1 | -1 | -1 | 1 | 1 | -1 | -1 |
| -1 | 1 | -1 | -1 | -1 | 1 | -1 | 1 | -1 | 1 |
| -1 | 1 | -1 | 1 | -1 | 1 | -1 | 1 | -1 | -1 |
| -1 | 1 | 1 | -1 | -1 | 1 | 1 | -1 | -1 | -1 |
| -1 | 1 | 1 | 1 | 1 | 1 | 1 | 1 | 1 | 1 |
| 1 | -1 | -1 | -1 | -1 | -1 | -1 | -1 | 1 | 1 |
| 1 | -1 | -1 | 1 | 1 | -1 | -1 | 1 | -1 | -1 |
| 1 | -1 | 1 | -1 | 1 | -1 | 1 | -1 | -1 | -1 |
| 1 | -1 | 1 | 1 | 1 | -1 | 1 | -1 | -1 | 1 |
| 1 | 1 | -1 | -1 | 1 | 1 | -1 | -1 | -1 | -1 |
| 1 | 1 | -1 | 1 | 1 | 1 | 1 | 1 | -1 | 1 |
| 1 | 1 | 1 | 1 | 1 | -1 | 1 | -1 | 1 | 1 |
| 1 | 1 | 1 | 1 | 1 | 1 | 1 | 1 | -1 | -1 |

EFFICIENT PRE-DISTORTED 12/4 QAM MODULATOR

BACKGROUND OF THE INVENTION

1. Field of the Invention

This invention relates to modulators and more specifically to pre-distorted 12/4-QAM modulators.

2. Background and Material Information

Although quadrature amplitude modulation (QAM) techniques are recognized to be bandwidth-efficient, these techniques are usually implemented with linear amplifiers to prevent introducing nonlinear distortion into the constellation. For space-to-ground applications, this is very inefficient. While nonlinear amplifiers are more efficient, they distort the QAM constellation. Generally, when bandwidth efficiencies of four bits per symbol is desired, 16 QAM is used because they are relatively simple to synthesize. However, 16 QAM has some undesirable characteristics. Furthermore, 16 QAM has multiple amplitude levels. If a signal is amplified with a saturating amplifier (e.g., on a space to earth downlink), when using 16-QAM, it may be required to back off or reduce the amplification so that the constellation is not distorted.

Further, conventional predistortion techniques, such as those used with 16-QAM, independently predistort the I and Q components of each constellation point. Hence, for a QAM modulation approach such as 16-QAM, 32 independent controls may be required to control the predistortion of the I and Q components. This may translate into additional hardware that is needed in the modulator. In some communication systems, such as satellite communication systems, additional hardware increases weight and power consumption, both of which may have limitations. Further, additional hardware increases the overall cost of the system.

Moreover, in some implementations of 16-QAM modulators with predistortion, for every symbol, a table is used to map the four data bits to a transmitted amplitude and phase. This mapping requires additional weight and power consumption which may be limited and increase the overall cost of the system.

SUMMARY OF THE INVENTION

The present invention is directed to a predistorted 12/4-Quadrature Amplitude Modulation (QAM) modulator, which may include a mapping device that maps input bits to a plurality of modulator control bits. The mapping may be determined by selected desired points on a 12/4-QAM constellation. At least one phase shift device may receive an input signal and at least one of the plurality of NRZ symbols. At least two quaternary phase shift keying (QPSK) devices may receive phase shifted signals from the at least one phase shift device. Each at least two QPSK devices may receive at least one of the plurality of NRZ symbols. An attenuator may attenuate a first QPSK signal outputted from a first QPSK device of the at least two QPSK devices. A summer may add the attenuated first QPSK signal with a second QPSK signal. The second QPSK signal may be outputted from a second QPSK device of the at least two QPSK devices. The summer outputs a predistorted 12/4-QAM of the modulator input bits. The plurality of NRZ symbols may control the at least one phase shift device and at least two QPSK devices to achieve the desired points on the 12/4-QAM constellation.

The attenuator may be a variable attenuator. At least one of the plurality of NRZ symbols may control at least one phase shift device to shift the input signal 30, 60, 120, or 150 degrees. At least one of the plurality of NRZ symbols may control the first QPSK device to shift the received phase shifted signals 45 degrees, 135 degrees, 225 degrees, or 315 degrees. At least one of the plurality of NRZ symbols may control the second QPSK device to shift the received phase shifted signals 45 degrees, 135 degrees, 225 degrees, or 315 degrees.

A splitter may split the phase shifted signals from at least one phase shift device into two phase shifted signals. The first QPSK device may receive one of the two phase shifted signals. The second QPSK device may receive a second of the two phase shifted signals. The first QPSK device and/or the second QPSK device may split the phase shifted signals into two phase shifted signals. An upper signal may be generated from one of the two phase shifted signals being shifted 0 degrees or 180 degrees. A lower signal may be generated from a second of the two phase shifted signals being shifted +90 degrees or −90 degrees. The first QPSK signal may be generated from adding the upper signal and the lower signal. The second QPSK signal may be generated from adding the upper signal and the lower signal.

The attenuator may include: a first switch that may receive the first QPSK signal; a plurality of attenuation elements where each of the plurality of attenuation elements may be operatively connected to the first switch, and where each of the plurality of attenuation elements may produce a different attenuation; a second switch operatively connected to each of the plurality of attenuation elements; and a controller where the controller may control the first switch and the second switch to cause the first QPSK signal to pass through one of the plurality of attenuation elements that attenuates the first QPSK signal.

The attenuator may also include: a variable gain amplifier that receives the first QPSK signal; a D/A converter operatively connected to the variable gain amplifier; and a controller that may control the variable gain amplifier to attenuate the first QPSK signal. The controller may control the variable voltage amplifier using the D/A converter. At least one phase shift device and at least two QPSK devices operate at a predistorted 12/4 QAM modulator symbol rate. The desired points on the 12/4 QAM constellation may be chosen so the number of bits of each desired point where adjacent desired points differ is minimized.

According to the present invention, a method for predistorted 12/4-Quadrature Amplitude Modulation (QAM) may include: selecting desired points on a 12/4-QAM constellation; mapping an input signal to a plurality of nonreturn-to-zero (NRZ) symbols where the mapping may be determined by the selected desired points; phase shifting a continuous wave (CW) signal where the phase shifting may be controlled by at least one of the plurality of NRZ symbols; splitting the phase shifted CW signal into a first phase shifted CW signal and a second phase shifted CW signal; performing quaternary phase shift key (QPSK) modulation on the first phase shifted CW signal and the second phase shifted CW signal where the QPSK modulator may be controlled by at least two of the plurality of NRZ symbols, and the QPSK modulator may generate a first QPSK signal and a second QPSK signal; attenuating the first QPSK signal; and adding the attenuated QPSK signal to the second QPSK signal where the addition may generate a predistorted 12/4-QAM signal with the desired points.

The CW signal may be phase shifted 30, 60, 120, or 150 degrees. The QPSK modulator may shift the first phase shifted CW signal 45, 135, 225, or 315 degrees. The QPSK modulator may shift the second phase shifted CW signal 45, 135, 225, or 315 degrees.

The QPSK modulator may include: splitting the first phase shifted signal into an upper signal and a lower signal; shifting the upper signal 0 degrees or 180 degrees; shifting the lower signal +90 degrees or −90 degrees; and adding the shifted upper signal and the shifted lower signal. The QPSK modulator may include: splitting the second phase shifted signal into an upper signal and a lower signal; shifting the upper signal 0 degrees or 180 degrees; shifting the lower signal +90 degrees or −90 degrees; and adding the shifted upper signal and the shifted lower signal. The phases shifting and the QPSK may occur at a modulator symbol rate.

The present invention is also directed to a predistorted 12/4 Quadrature Amplitude Modulation (QAM) modulator that may include: a first phase shift module where the first phase shift module receives an input signal and a fifth NRZ symbol; a second phase shift module operatively connected to an output of the first phase shift module where the second phase shift module receives a sixth NRZ symbol; a first QPSK module operatively connected to an output of the second phase shift module where the first QPSK module receives a phase shifted signal from the second phase shift module, and the first QPSK module receives a first NRZ symbol and a second NRZ symbol; a second QPSK module operatively connected to the output of the second phase shift module where the first QPSK receives the phase shifted signal from the second phase shift module, and the second QPSK module receives a third NRZ symbol and a fourth NRZ symbol; a variable attenuator where the variable attenuator may be operatively connected to the second QPSK module; and a summer operatively connected to the first QPSK module and the variable attenuator where the summer produces a 12/4 QAM signal by adding a QPSK signal from the first QPSK module with an attenuated signal from the variable attenuator. An input signal may be mapped to the first NRZ symbol, second NRZ symbol, third NRZ symbol, fourth NRZ symbol, fifth NRZ symbol, and sixth NRZ symbol based on desired points on a 12/4 QAM constellation. The first NRZ symbol, second NRZ symbol, third NRZ symbol, fourth NRZ symbol, fifth NRZ symbol, and sixth NRZ symbol may control the 12/4 QAM modulator to produce the desired points on the 12/4 QAM constellation.

The present invention is further directed to a pre-distortion QAM modulator that may include: at least one phase shift module operating at a modulator symbol rate where the at least one phase shift module may receive an input signal; at least two quaternary phase shift keying modules operating at the modulator symbol rate where the at least two quaternary phase shift keying modules may be operatively connected to the at least one phase shift module, and each at least two quaternary phase shift keying modules may receive a different portion of a signal from the at least one phase shift module, and the at least one phase shift module and the at least two quaternary phase shift keying modules may receive at least one nonreturn-to-zero (NRZ) symbol input; a variable attenuator device operatively connected to one of the at least two quaternary phase shift keying modules; a summer operatively connected to the at least two quaternary phase shift keying modules where the summer may produce a modulator output signal by adding output signals from the at least two quaternary phase shift keying modules. The modulator output signal may be a pre-distorted QAM modulation for the at least one NRZ symbol that compensates for amplitude compression due to distortion from a nonlinear element between the modulator output signal and a demodulator.

The present invention is directed to a method for pre-distorted QAM modulation that includes: receiving a carrier signal and at least one input symbols; phase modulating the carrier signal at an input symbol rate; splitting the phase modulated carrier signal into parts; modulating each phase modulated carrier signal part at the input symbol rate using quaternary phase shift keying; attenuating one of the quaternary phase shift keying modulated phase modulated carrier signal parts; and summing the attenuated one of the quaternary phase shift keying modulated phase modulated carrier signal parts with each other quaternary phase shift keying modulated phase modulated carrier signal part. The summing may produce a pre-distorted QAM modulation for the at least one input symbol that compensates for amplitude compression due to demodulator nonlinear distortion.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION OF THE PREFERRED EMBODIMENTS

Figure 1:
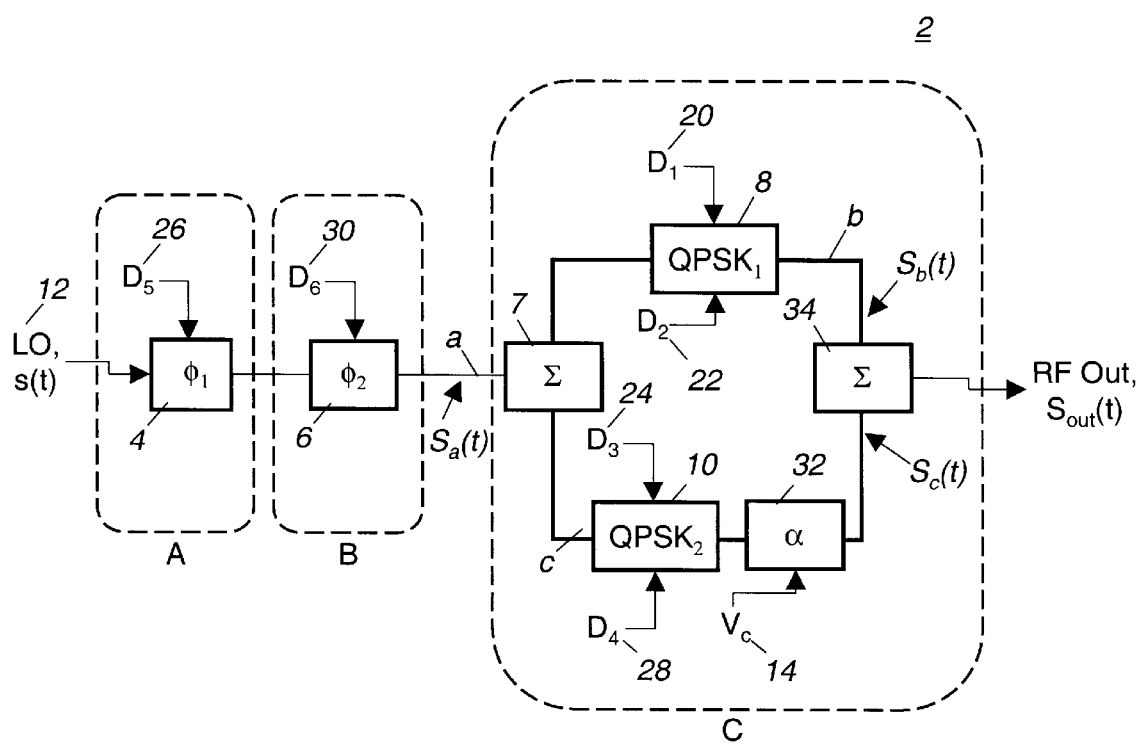
FIG. 1 is a schematic diagram of an exemplary predistortion 12/4 QAM modulator architecture according to the present invention.

The particulars shown herein are by way of example and for purposes of illustrative discussion of the embodiments of the present invention. The description taken with the drawings make it apparent to those skilled in the art how the several forms of the present invention may be embodied in practice.

The present invention implements an efficient predistortion architecture that accurately accounts for the nonlinearities described above in a manner that minimizes modulator cost, complexity and DC power consumption. An architecture according to the present invention achieves this through a predistortion scheme that may require only a single variable attenuator element that, once adjusted for the non-linearities of a given nonlinear element (e.g., traveling wave tube amplifier (TWTA) or solid state power amplifier (SSPA)) operating point, requires little or no adjustment while the modulator is in operation. This approach is superior to conventional predistortion modulator architectures, discussed previously, where the predistortion correction circuits may have to be looked up in a table once every symbol, and require significant memory and/or hardware. Thus, the components used to implement predistortion in an architecture according to the present invention may be driven by low rate, low power devices thus reducing modulator cost.

In a 12/4-QAM modulator according to the present invention, the amplitude of the inner ring is adjusted, and reliance is placed on an adaptive compensation approach at the detector to mitigate any phase rotation. Therefore, in a 12/4-QAM modulator according to the present invention, only one versus 32 phase and amplitude adjustments may be required.

Distortion may be mitigated by predistorting the constellation at the input to the nonlinearity to produce the desired constellation at the output of the nonlinearity. For example, 12/4-QAM is particularly attractive because it has two amplitude levels, an outer ring and an inner ring. The outer ring may be set so that the level saturates the amplifier (e.g., a TWTA which has nonlinear power characteristics). This is more efficient than 16-QAM, since the power level does not have to be reduced, therefore, 12/4-QAM allows more average power to be transmitted by the amplifier. With 12/4 QAM, magnitude levels and predistortion adjusts the magnitude and phase of the inner ring is adjusted to precompensate for the amplitude modulation-amplitude modulation (AM—AM) and amplitude modulation-phase modulation AM/PM of a nonlinear amplifier (e.g., TWTA, SSPA).

As the power into a nonlinear amplifier changes, the phase shift through the nonlinear amplifier will change. If a 16 QAM signal is sent to a nonlinear amplifier, the nonlinear amplifier may move all of the points in amplitude (due to the power-in to power-out nonlinear characteristics), and may also rotate the points in phase. Therefore, all of the constellation points of the 16 QAM waveform may be distorted after passing through the nonlinear amplifier. Typically, the amplitude and phase may be predistorted prior to the nonlinear amplifier, such that after the nonlinear amplifier, the amplitude and the phase of all constellation points are in their desired locations. Since, the amplitude and phase may need to be adjusted for a 16 QAM, as mentioned previously, there may be 32 adjustments necessary.

In 12/4-QAM implemented according to the present invention, the outer ring points on the constellation do not need to be predistorted. Only the amplitude and possibly the phase of the points on the inner ring of the constellation may need to be predistorted at the input to the nonlinear amplifier. Therefore, in 12/4-QAM according to the present invention, only two (and possibly one) adjustments may be used, as opposed to the 32 required with 16-QAM.

FIG. 1 shows a schematic diagram of an exemplary predistortion 12/4 QAM modulator architecture 2 according to an example embodiment of the present invention. Modulator architecture 2 consists of two phase shifter modules ($\Phi_1$, $\Phi_2$) 4, 6, two quaternary phase shift keying (QPSK) modulators 8, 10, splitter 7, local oscillator signal (LO) 12 and amplitude control signal (Vc)14, six high-speed (at symbol rate) nonreturn-to-zero (NRZ) symbol inputs ($D_1$–$D_6$), 20, 22, 24, 26, 28, 30 where each NRZ symbol input may be +1 or –1, variable attenuator element 32, and summer 34.

Modulator input signal 12 and NRZ symbol input $D_5$ are received by phase shift module 4(A). Phase shift module 6(B) is operatively connected to phase shift module 4, and receives NRZ symbol input $D_6$. An output from phase shift module 6 is operatively connected to signal splitter 7. QPSK modulator 8(C) is operatively connected to splitter 7, and receives NRZ symbol input $D_1$ and NRZ symbol input $D_2$. QPSK modulator 10 is operatively connected to splitter 7, and receives NRZ symbol input $D_3$ and NRZ symbol input $D_4$. Variable attenuator element 32 is operatively connected to QPSK modulator 10. Summer 34 is operatively connected to QPSK modulator 8 and QPSK modulator 10.

In predistorted 12/4-QAM modulator architecture 2, phase modulation may be produced via phase shifter modules 4, 6 and quadrature amplitude modulation may be produced via the parallel connection of QPSK modulator 8 and QPSK modulator 10.

The operation of exemplary predistortion 12/4-QAM modulator architecture 2 according to the present invention is described by tracking the signals as they pass through the system. The modulator input signal 12 may be a continuous wave local oscillator (CW LO) signal s(t). Modulator input signal s(t) 12 entering the modulator may be represented in phasor notation as:

$$s(t)=e^{j\omega t} \quad (1)$$

where ω is equal to the carrier frequency in radians/sec. Phase shifter modules 4, 6 phase modulate the carrier at the symbol rate. Phase shifter 4 shifts the phase of input signal 12 s(t)+30 degrees if $D_5$=+1, and –30 degrees if $D_5$=–1. Phase shifter 6 receives an output signal from phase shifter 4 and shifts the phase of the signal +30 degrees if $D_6$=+1, and –30 degrees if $D_6$=–1. The result of phase shifter 4 and phase shifter 6 produces a signal at the output of phase shifter 6 (point a) that is equal to:

$$S_a(t) = e^{j(\omega t + D_5 \Phi_1 + D_6 \Phi_2)} \quad \begin{array}{l}\phi_1 = \Pi/6 \text{ radians} \\ \phi_2 = \Pi/6 \text{ radians}\end{array} \quad (2)$$

This signal is then split by splitter 7 into two identical signals. One signal is sent to QPSK modulator 8 and the other signal is sent to QPSK modulator 10. Inside QPSK module 8 and QPSK module 10, the received Sa(t) signal is again split into two identical signals, i.e., upper and lower signals.

In QPSK module 8, if $D_1$=+1, the upper signal is shifted 0 degrees, and if $D_1$=–1, the upper signal is shifted +180 degrees. If $D_2$=+1, the lower signal is shifted +90 degrees, and if $D_2$=–1, the lower signal is shifted –90 degrees. The phase shifted upper signal and the phase shifted lower signal in QPSK module 8 are then summed producing a signal Sb(t) that has been phase shifted by either 45, 135, 225, or 315 degrees.

Similarly, in QPSK module 10, if $D_3$=+1, the upper signal is shifted 0 degrees, and if $D_3$=–1, the upper signal is shifted +180 degrees. If $D_4$=+1, the lower signal is shifted +90 degrees, and if $D_4$=–1, the lower signal is shifted –90 degrees. The phase shifted upper signal and the phase shifted lower signal in QPSK module 10 are then summed producing a signal that has been phase shifted by either 45, 135, 225, or 315 degrees.

Both QPSK modules 8 and 10 operate at the modulator symbol rate. The QPSK modulated signal at the output of QPSK module 8 (point b) is equal to:

$$S_b(t)=(D_1+jD_2)e^{j(\omega t+D_5\Phi_1+D_6\Phi_2)} \quad (3)$$

The QPSK modulated signal at the output of QPSK module 10 passes through a variable attenuator element 32 controlled by voltage Vc 14. Variable attenuator element 32 may be used to reduce the amplitude of the signal at the output of QPSK module 10 by a factor of $\forall$. Therefore, the signal Sc(t) at the output of variable attenuator element 32 (point c) is equal to:

$$S_c(t) = \forall (D_3 + jD_4) e^{j(\omega t + D_5 \Phi_1 + D_6 \Phi_2)} \quad (4)$$

The two signals Sb(t) and Sc(t) may be then summed together by summer 34 to produce the modulator signal output:

$$S_{out}(t) = [(D_1 + \forall D_3) + j(D_2 + \forall D_4)] e^{j(\omega t + D_5 \Phi_1 + D_6 \Phi_2)} \quad (5)$$

In Eqs. 2–5, $D_1$–$D_6$ may be NRZ signals and may take on values of ±1, therefore, $S_{out}(t)$ represents a complex carrier that may have a phase constellation that consists of $2^6 = 64$ points in the I-Q plane. However, only 16 of the 64 points are used.

The functional elements A, B and C in FIG. 1 may occur in any order. For example, in another embodiment of the present invention, element A (phase shift module 4) may occur after element C (QPSK modulator 8) and thus receive and process the output from element C.

Moreover, in still another embodiment of the present invention, element C may receive input signal 12, process it, and supply one or more outputs to elements A and B for further processing. Functional elements A, B and C in FIG. 1 may occur in any order and still be within the spirit and scope of the present invention.

Figures 2, 3:
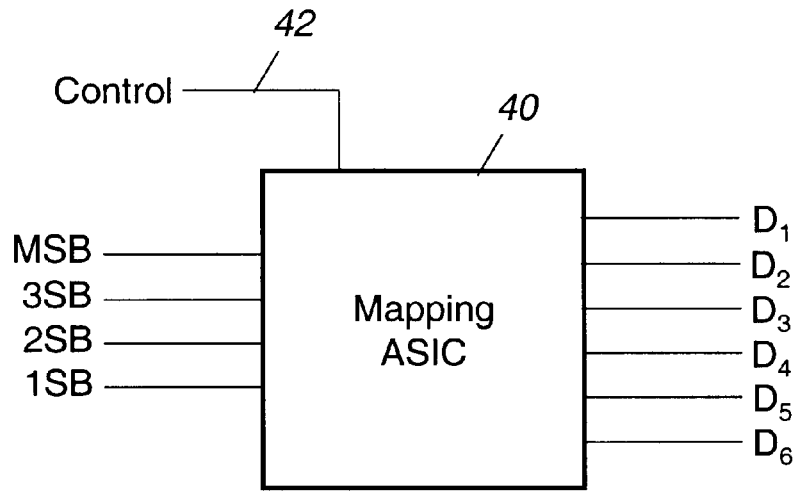
FIG. 2 is a block diagram of an exemplary mapping device according to the present invention.
FIG. 3 is a table of an exemplary 4 bit to 6 bit mapping according to the present invention.

FIG. 2 shows a block diagram of an exemplary mapping device 40 that maps 4 input bits to the 6 modulator control bits. Mapping device 40 may be any one of many type of electronic devices, e.g., gate array, programmable logic array (PLA), programmable read only memory (PROM), etc. In this exemplary embodiment, mapping device 40 is an application specific integrated circuit (ASIC). Mapping device 40 receives 4 bits, that represent the four input bits, and maps these to 6 modulator control bits. In this exemplary embodiment, 16 points out of the 64 points in the I-Q plane are selected that match the desired 12/4-QAM phase constellation. Therefore, the mapping device maps the 4 input bits to the 6 modulator control bits ($D_1$–$D_6$), 20, 22, 24, 26, 28, 30 that control modulator 2 to produce the desired 16 points on the 12/4-QAM constellation.

FIG. 3 shows a table of an exemplary 4 bit to 6 bit mapping performed by mapping device 40 according to the present invention. The four left-most columns represent all the combinations of the 4 input bits from most significant bit (MSB) to least significant (LSB). The six right-most columns represent the values of the modulator control bits ($D_1$–$D_6$), 20, 22, 24, 26, 28, 30 that are mapped to each combination of 4 input bits. These modulator control bits ($D_1$–$D_6$), 20, 22, 24, 26, 28, 30 are input to modulator 2 in FIG. 1. Modulator control bits ($D_1$–$D_6$), 20, 22, 24, 26, 28, 30 control modulator 2 such that there may be a maximum 64 points in a phase constellation.

However, due to the 4 bit to 6 bit mapping, only the 16 points out of the 64 points in the I-Q plane are selected that match the desired 12/4 QAM phase constellation and, therefore, only the combination of values of modulator control bits ($D_1$–$D_6$), 20, 22, 24, 26, 28, 30 required to produce this constellation (i.e., the combination of values in FIG. 3) are needed. Other combinations of NRZ symbol inputs ($D_1$–$D_6$), 20, 22, 24, 26, 28, 30 (not shown) represent the other 48 points (i.e., 64−16) that do not correspond to the desired points of the 12/4-QAM constellations.

Although a specific 4 bit to 6 bit mapping is shown in FIG. 3, all 4 bit to 6 bit mappings are within the spirit and scope of the present invention. For example, either the left side (MSB-LSB) or right-side ($D_1$–$D_6$) of FIG. 3 may be shuffled vertically (e.g., rows rearranged), and still be within the spirit and scope of the present invention. The exemplary mapping shown in FIG. 3 is advantageous since these values represent a mapping where the number of bits where adjacent constellation points differ is minimized. Therefore, if there is a symbol error, the number of bit errors is minimized. For example, if a symbol with bits '0000' is sent, and the adjacent symbol is '1111', if there is a symbol error (i.e., the adjacent symbol is erroneously detected), this equates to 4 bit errors. However, if the adjacent symbol is '1000' and there is a symbol error, there is only 1 bit error. Accordingly, a mapping may be defined by setting up a constellation with the desired 12/4 QAM points, and then generating the 4 bit to 6 bit mapping table based on the desired 12/4 QAM constellation.

In another example embodiment of the present invention, mapping device 40 may contain multiple tables of 4 bit to 6 bit mappings similar to that shown in FIG. 3. Each table may be different, i.e. each containing a unique 4 bit to 6 bit mapping, thereby providing flexibility and dynamic reconfiguring of 12/4-QAM modulator 2. Mapping device 40 may contain one or more control inputs 42 that allow selection of one of many tables in mapping device 40 to provide a desired 4 bit to 6 bit mapping. Multiple mapping tables that are selectable allow for compensation of the AM to PM conversion of the nonlinear amplifier.

Further, mapping device 40 may be programmable where the desired 4 bit to 6 bit mapping is programmed into mapping device 40. In this embodiment, mapping device 40 may be a programmable device, e.g., a memory, Programmable Logic Array (PLA), etc., where mapping device 40 is reconfigurable. Mapping device 40 may be programmable, for example, by control bits that reconfigure the mapping, by downloading the desired mapping, or by scanning a bit sequence into programming device 40 to obtain a table with a desired 4 bit to 6 bit mapping. Mapping device 40 may be programmed with multiple 4 bit to 6 bit mappings, that may be later changed by reprogramming.

Figure 4:
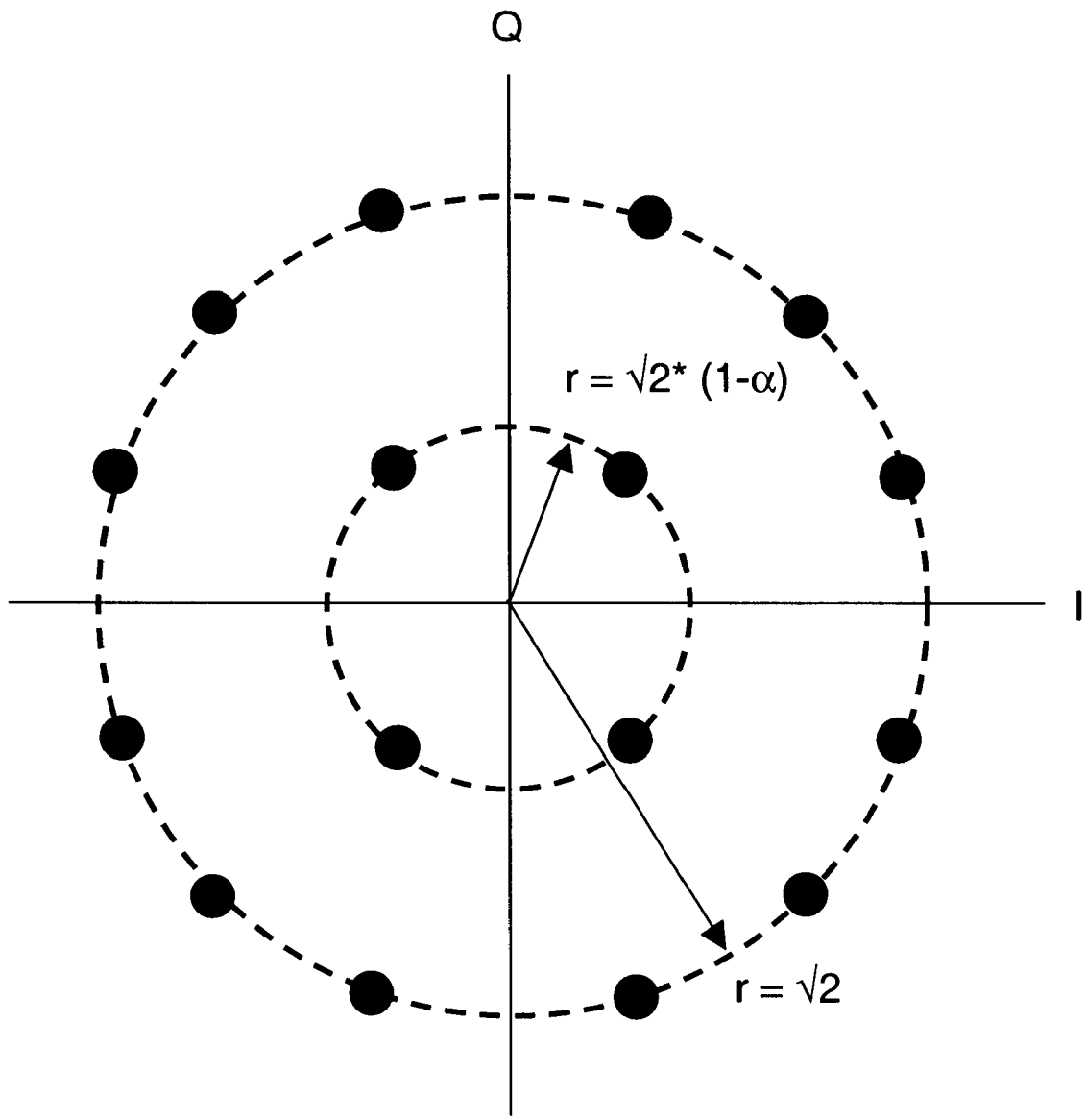
FIG. 4 is a diagram of an exemplary constellation based on the modulator shown in FIG. 1, and the mapping shown in FIG. 3.

FIG. 4 shows a diagram of an exemplary constellation based on the modulator shown in FIG. 1, and the mapping shown in FIG. 3. The x-axis represents the in-phase component of the constellation point, and the y-axis represents the quadrature phase component. The constellation shows 12 points on the outer ring and 4 points on the inner ring for 12/4-QAM. An important feature to note in the above derivation is that the relative amplitude of the outer ring and inner ring may be set by the attenuation value α. As FIG. 4 indicates, the inner ring radius may be a factor of 1/α smaller than the outer ring radius. Thus, in the hardware implementation, if factor α is achieved using variable attenuator element 32, the ring ratio of the constellation may be easily adjusted. This is beneficial since the ring ratio may be set to be a certain value at the nonlinear amplifier (e.g., TWTA) output.

Figure 5:
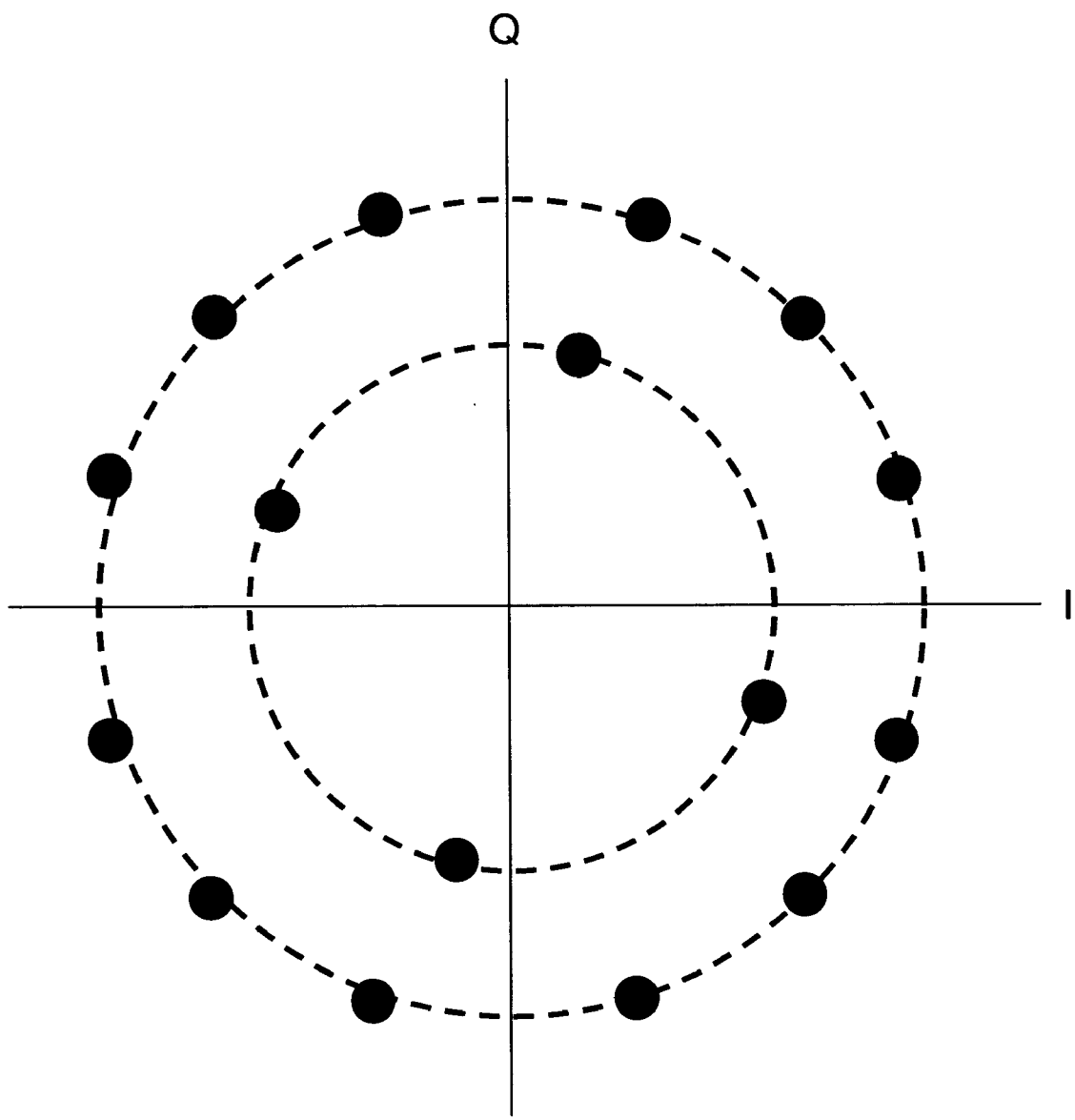
FIG. 5 is a diagram of an exemplary constellation showing the effects of a nonlinear element on the constellation shown in FIG. 4.

FIG. 5 shows a diagram of the effects of a nonlinear element (e.g., amplifier) on the constellation shown in FIG. 4. The nonlinearity of an amplifier may result in amplitude modulation to amplitude modulation (AM—AM) and amplitude modulation to phase modulation (AM–PM) distortion that compresses the two amplitude levels and rotates the inner ring relative to the outer ring. The compression of the two ring amplitudes, shown in FIG. 5, may be dependent on the amplifier operating point. For example, as discussed previously, the outer ring may be set at the saturation point of the nonlinear amplifier. In this case, this point would be the amplifier operating point. However, the outer ring may also be set at less than the saturation point (e.g., 1 dB less than saturation, 5 dB less than saturation, etc.). Here, this less than saturation point would be the operating point of the amplifier. Therefore, the operating point of the amplifier may be a predictable parameter that may be easily measured. Adjusting the attenuation value ∀ to compensate for the compression caused by the nonlinear amplifier precompensates for this amplitude compression in a predistortion 12/4 QAM modulator architecture according to the present invention.

Further, in a predistortion 12/4 QAM modulator architecture according to the present invention, the attenuation value ∀ is adjusted once, or at a low rate (e.g., once every hour, once a day, etc.), and not once every symbol as in some other implementations of predistorted modulators. The attenuation value ∀ is adjusted when the characteristics of the amplifier changes, for example due to a change in temperature, causing the signal distortion by the amplifier to change. The attenuation value α may be adjusted automatically or manually. For example, in a space to ground system, the attenuation may be adjusted from the ground by a command sent to the spacecraft. It may also be adjusted automatically by the spacecraft when the spacecraft senses a change in temperature of the amplifier, and then automatically re-adjusts the attenuation value α accordingly based on predetermined values stored in a lookup table.

Figure 6:
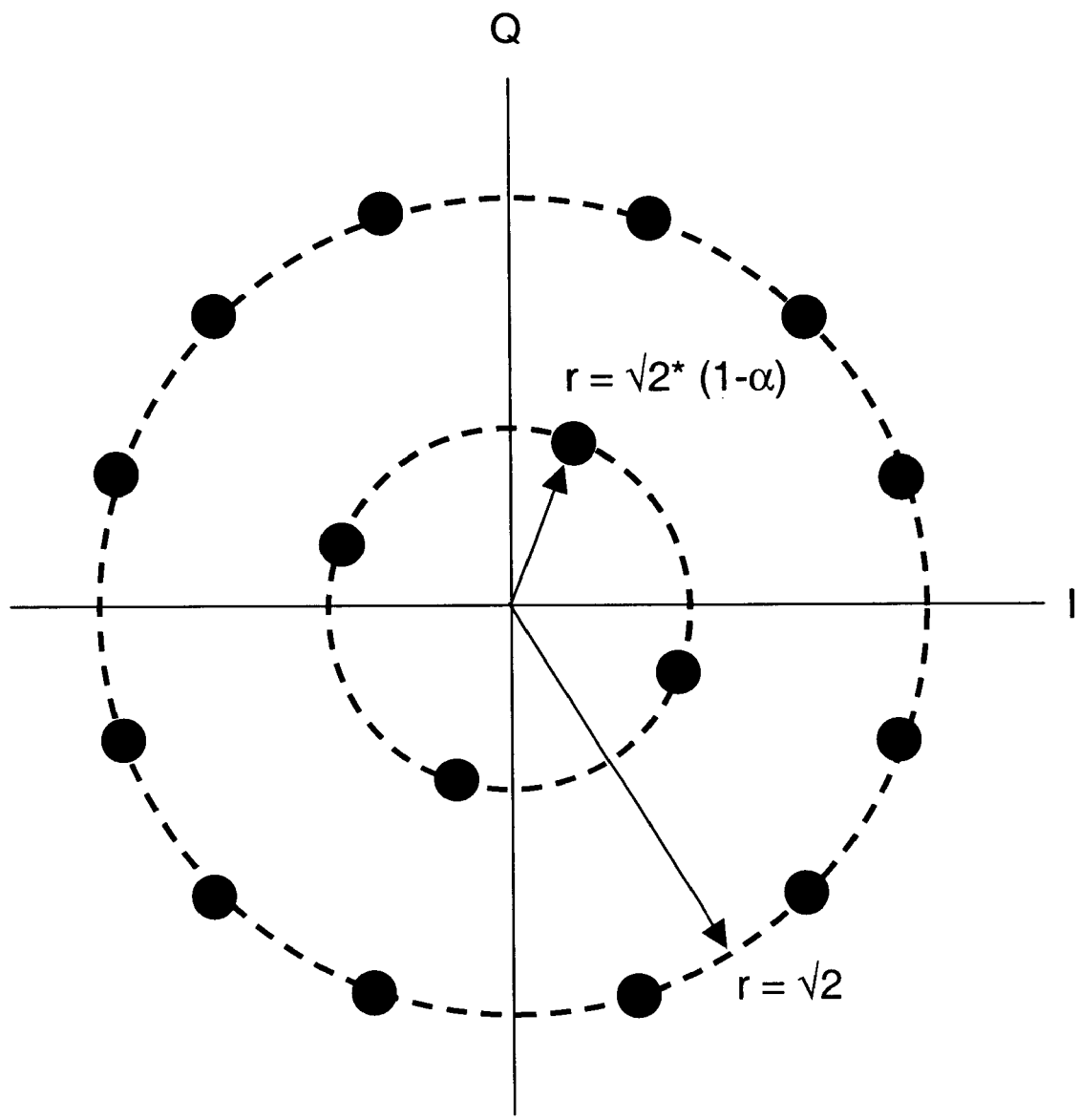
FIG. 6 is a diagram of an exemplary predistorted constellation according to the present invention after passing through a nonlinear element.

FIG. 6 shows a diagram of an exemplary predistorted constellation, according to the present invention, after passing through a nonlinear element. The amplitude compression has been eliminated leaving only the phase rotation of the inner ring. Due to the circular symmetry of the 12/4-QAM constellation, the phase rotation of the inner ring does not bring the constellation points within a ring closer together. Thus, a demodulator that employs adaptive decision techniques may easily adjust the decision boundaries to account for the phase rotation.

Adaptive decision techniques may be used in conjunction with error correction encoding for both hard- and soft-decision techniques in which the decision boundaries and reference constellations, respectively, are optimized based on the locations of the received constellation points. The optimization minimizes the bit error rate (BER), and thus may provide bit error rate performance that is nearly identical to the BER performance of an ideal 12/4 QAM constellation.

Figure 7:
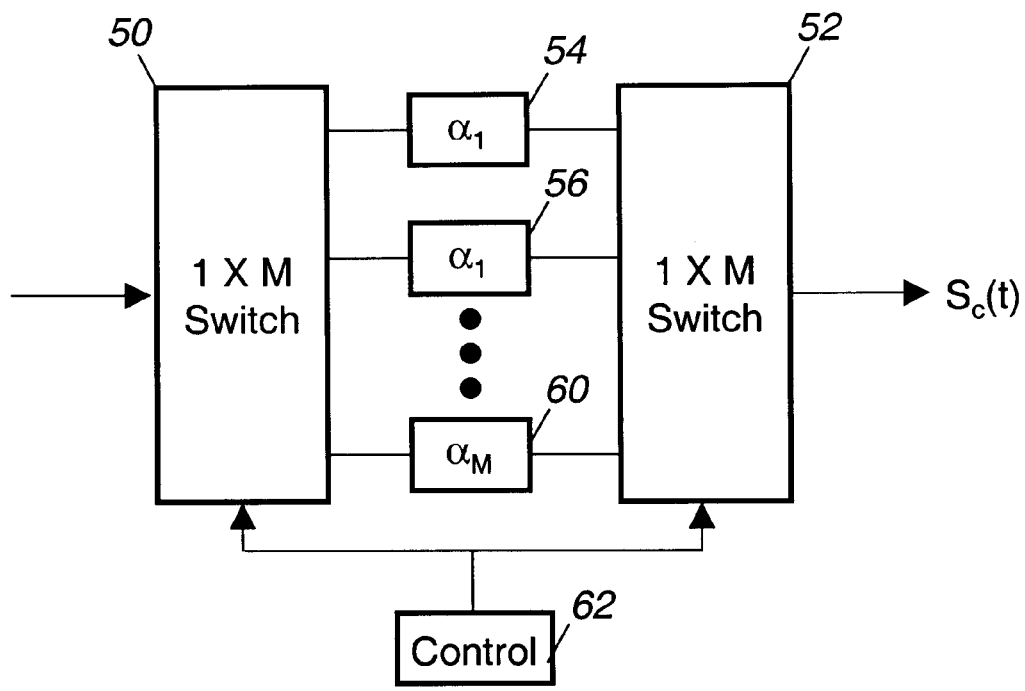
FIG. 7 is a block diagram of an exemplary embodiment of an attenuator element according to the present invention.

A variable attenuator element 32 employed in a predistortion 12/4 QAM modulator architecture according to the present invention may be implemented in many ways. FIG. 7 shows a block diagram of an exemplary embodiment of an attenuator element according to the present invention. This embodiment allows M possible attenuation levels by employing two 1×M switches 50, 52 and a bank of attenuator elements 54, 56, 60. There may be any number of attenuator elements connected between the two switches 50, 52. Each individual attenuator element 50, 52, 60, etc. may have a different fixed attenuation factor/value ∀. The two switches 50, 52 are switched such that the signal received is routed through one of the attenuator elements 50, 52, 60, etc. Controller 62 controls switches 50, 52 to select one of the attenuator elements to obtain the desired inner to outer ring ratio on the constellation. As discussed previously, once the attenuation value α is set to compensate for distortion from a nonlinear element, the attenuation value α may only need to be re-adjusted to compensate for distortion changes, e.g., because of a temperature change in or around the nonlinear element.

Figure 8:
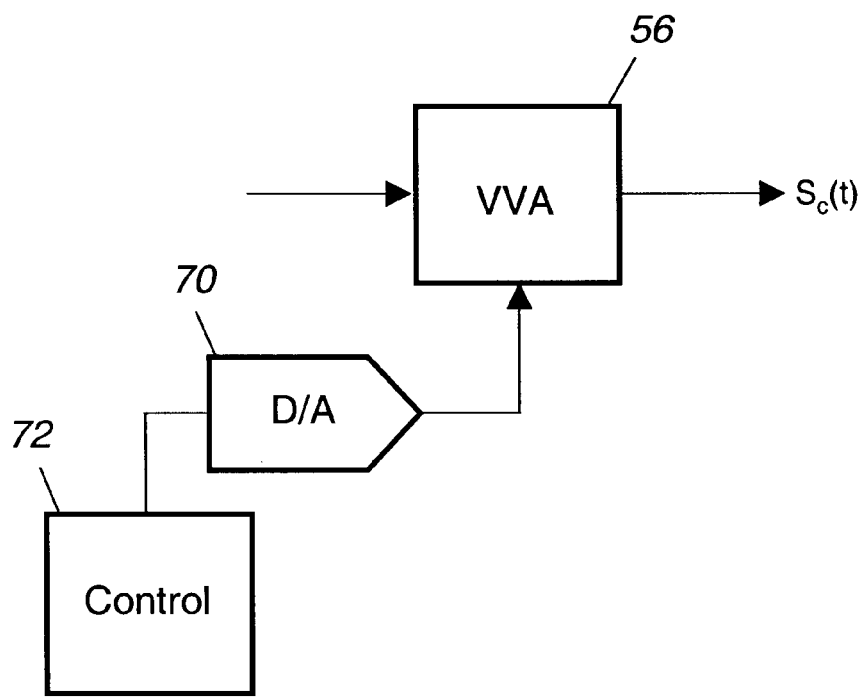
FIG. 8 is a block diagram of a second exemplary embodiment of an attenuator element according to the present invention.

FIG. 8 shows a block diagram of another exemplary embodiment of an attenuator element according to the present invention. In this embodiment, a Voltage Variable Attenuator (VVA) 56 driven by a D/A converter 70 controlled by controller 72 is used. Controller 72 adjusts VVA 56 through D/A converter 70 to set VVA 56 to get the desired inner to outer ring ratio on the constellation. The attenuator element implementation in FIG. 8 may have advantages over the implementation in FIG. 7 because the D/A conversion offers nearly continuous attenuation range, therefore, allowing the attenuation value to be changed in a "glitch free" fashion without disrupting the modulator to demodulator transmission.

Both attenuator element embodiments result in very low DC power consumption as switches 50, 52 may be passive, and D/A converter 70 may be a low-speed, low power CMOS design. Furthermore, because the predistortion correction circuitry does not operate at the modulator symbol rate, the need for high speed digital circuitry, which is high power and costly, is eliminated.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed:

1. A predistorted 12/4 Quadrature Amplitude Modulation (QAM) modulator comprising:
a mapping device mapping a modulator input bits to a plurality of nonreturn-to-zero (NRZ) modulator control bits, the mapping being determined by selected desired points on a 12/4 QAM constellation;
a phase shift device, the phase shift device receiving an input signal and at least one of the plurality of NRZ modulator control bits;
at least two quaternary phase shift keying (QPSK) modulators, the QPSK modulators receiving phase shifted signals from the phase shift device, each QPSK modulator receiving NRZ modulator control bits;
an attenuator, attenuating a first QPSK signal outputted from a first of the QPSK modulators; and
a summer, adding the attenuated first QPSK modulated signal with a second QPSK modulated signal, the second QPSK modulated signal being outputted from a second of the QPSK modulator, the summer outputting a predistorted 12/4QAM signal;
wherein the plurality of modulator control bits control the phase shift device and the two QPSK modulators to achieve the desired points on the 12/4 QAM constellation.

2. The modulator according to claim 1, wherein the attenuator is a variable attenuator.

3. The modulator according to claim 1, at least one of the plurality of NRZ modulator control bits controlling the phase shift device to shift the input signal 30 degrees.

4. The modulator according to claim 1, at least one of the plurality of NRZ modulator control bits controlling the phase shift device to shift the input signal 60 degrees.

5. The modulator according to claim 1, at least one of the plurality of NRZ modulator control bits controlling the phase shift device to shift the input signal 120 degrees.

6. The modulator according to claim 1, at least one of the plurality of NRZ modulator control bits controlling the phase shift device to shift the input signal 150 degrees.

7. The modulator according to claim 1, two of the plurality of modulator control bits controlling the first QPSK modulator shift the received phase shifted signals one of 45 degrees, 135 degrees, 225 degrees, and 315 degrees.

8. The modulator according to claim 1, two of the plurality of modulator control bits controlling the second QPSK modulator shift the received phase shifted signals one of 45 degrees, 135 degrees, 225 degrees, and 315 degrees.

9. The modulator according to claim 1, comprising a splitter, splitting the phase shifted signals from the phase shift device into two phase shifted signals, the first QPSK modulator receiving one of the two phase shifted signals, the second QPSK modulator receiving a second of the two phase shifted signals.

10. The modulator according to claim 1, the first QPSK modulator splitting the phase shifted signals into two phase shifted signals, an upper signal being generated from one of the two phase shifted signals being shifted one of 0 degrees and 180 degrees, a lower signal being generated from a second of the two phase shifted signals being shifted one of +90 degrees and −90 degrees, the first QPSK modulator generated from adding the upper signal and the lower signal.

11. The modulator according to claim 1, the second QPSK modulator splitting the phase shifted signals into two phase shifted signals, an upper signal being generated from one of the two phase shifted signals being shifted one of 0 degrees and 180 degrees, a lower signal being generated from a second of the two phase shifted signals being shifted one of +90 degrees and −90 degrees, the second QPSK modulated signal generated from adding the upper signal and the lower signal.

12. The modulator according to claim 1, the attenuator comprising:
a first switch, positioned for receiving the first QPSK signal;
a plurality of attenuation elements, each of the plurality of attenuation elements operatively connected to the first switch, each of the plurality of attenuation elements producing a different attenuation;
a second switch, operatively connected to each of the plurality of attenuation elements; and
a controller, controlling the first switch and the second switch to cause the first QPSK signal to pass through one of the plurality of attenuation elements, the one of the plurality of attenuation elements attenuating the first QPSK signal.

13. The modulator according to claim 1, the attenuator comprising:
a variable gain amplifier, receiving the first QPSK signal;
a D/A converter, operatively connected to the variable gain amplifier; and
a controller, controlling the variable gain amplifier to attenuate the first QPSK signal, the controller controlling the variable voltage amplifier using the D/A converter.

14. The modulator according to claim 1, the phase shift devices and the QPSK modulators operating at a predistorted 12/4-QAM modulator symbol rate.

15. The modulator according to claim 1, the desired points on the 12/4-QAM constellation being chosen so the number of bits of each desired point where adjacent desired points differ is minimized.

16. The modulator according to claim 1, the mapping device containing multiple tables with different mappings of the modulator input bits to a plurality of NRZ modulator control bits, the desired table being selectable based on a desired mapping.

17. The modulator according to claim 1, the mapping device being programmable to contain a desired mapping of the modulator input bits to a plurality of NRZ modulator control bits.

18. A method for predistorted 12/4-Quadrature Amplitude Modulation (QAM) comprising:
selecting desired points on a 12/4 QAM constellation;
mapping an input signal to a plurality of modulator control bits, the mapping determined by the selected desired points;
phase shifting a continuous wave (CW) signal, the phase shifting being controlled by at least one of the plurality of modulator control bits;
splitting the phase shifted CW signal into a first phase shifted CW signal and a second phase shifted CW signal;
performing quaternary phase shift keying (QPSK) modulation on the first phase shifted CW signal and the second phase shifted CW signal, each QPSK controlled by two of the plurality of modulator control bits;
attenuating the first QPSK modulated CW signal; and
summing the attenuated QPSK modulated CW signal to the second QPSK modulated CW signal, the sum being a predistorted 12/4-QAM signal with the desired points.

19. The method according to claim 18, comprising phase shifting the CW signal 30 degrees.

20. The method according to claim 18, at least one of the plurality of modulator control bits controlling the phase shift device to shift the input signal 60 degrees.

21. The method according to claim 18, at least one of the plurality of modulator control bits controlling the phase shift device to shift the input signal 120 degrees.

22. The method according to claim 18, at least one of the plurality of modulator control bits controlling the phase shift device to shift the input signal 150 degrees.

23. The method according to claim 18, the QPSK modulator shifting the first phase shifted CW signal one of 45, 135, 225, and 315 degrees.

24. The method according to claim 18, performing quaternary phase shift keying (QPSK) modulation on the second phase shifted CW signal including shifting the second phase shifted CW signal one of 45, 135, 225, and 315 degrees.

25. The method according to claim 18, performing quaternary phase shift keying (QPSK) modulation on the first phase shifted CW signal including:
splitting the first phase shifted CW signal into an upper signal and a lower signal;
shifting the upper signal one of 0 degrees and 180 degrees;
shifting the lower signal one of +90 degrees and −90 degrees; and
adding the shifted upper signal and the shifted lower signal.

26. The method according to claim 18, performing quaternary phase shift keying (QPSK) modulation on the second phase shifted CW signal including:

splitting the second phase shifted CW signal into an upper signal and a lower signal;

shifting the upper signal one of 0 degrees and 180 degrees;

shifting the lower signal one of +90 degrees and −90 degrees; and adding the shifted upper signal and the shifted lower signal.

27. The method according to claim 18, the phases shifting and the QPSK modulation occurring at a modulator symbol rate.

28. A predistorted 12/4 Quadrature Amplitude Modulation (QAM) modulator comprising:

a first phase shift module, the first phase shift module receiving an input signal and a fifth modulator control;

a second phase shift module operatively connected to an output of the first phase shift module, the second phase shift module receiving a sixth modulator control bit;

a first QPSK module operatively connected to an output of the second phase shift module, the first QPSK module receiving a phase shifted signal from the second phase shift module, the first QPSK module receiving a first modulator control and a second modulator control bit;

a second QPSK module operatively connected to the output of the second phase shift module, the first QPSK receiving the phase shifted signal from the second phase shift module, the second QPSK module receiving a third modulator control bit and a fourth modulator control bit;

a variable attenuator, the variable attenuator operatively connected to the second QPSK module; and a summer operatively connected to the first QPSK module and the variable attenuator, the summer producing a 12/4-QAM signal by adding a QPSK signal from the first QPSK module with an attenuated signal from the variable attenuator, and wherein an input signal is mapped to the first modulator control bit, second modulator control bit, third modulator control bit, fourth modulator control bit, fifth modulator control bit, and sixth modulator control bit based on desired points on a 12/4 QAM constellation, the first modulator control bit, second modulator control bit, third modulator control bit, fourth modulator control bit, fifth modulator control bit, and sixth modulator control bit controlling the 12/4 QAM modulator to produce the desired points on the 12/4 QAM constellation.

29. A pre-distorted QAM modulator comprising:

a phase shift module operating at a modulator symbol rate, the phase shift module receiving an input signal;

at least two quaternary phase shift keying modules operating at the modulator symbol rate, the at least two quaternary phase shift keying modules operatively connected to the phase shift module, each at least two quaternary phase shift keying modules receiving a different portion of a signal from the phase shift module, the phase shift module and the quaternary phase shift keying modules receiving at least one nonreturn-to-zero (NRZ) symbol input;

a variable attenuator device operatively connected to one of the quaternary phase shift keying modules;

a summer operatively connected to the quaternary phase shift keying modules, the summer producing a modulator output signal by adding output signals from the quaternary phase shift keying modules, wherein the modulator output signal is a pre-distorted QAM modulation for the at least one NRZ symbol that compensates for amplitude compression due to distortion from a nonlinear element between the modulator output signal and a demodulator.

30. A method for pre-distorted QAM modulation comprising:

receiving a carrier signal and at least one input symbols;

phase modulating the carrier signal at an input symbol rate;

splitting the phase modulated carrier signal into parts;

modulating each phase modulated carrier signal part at the input symbol rate using quaternary phase shift keying;

attenuating one of the quaternary phase shift keying modulated phase modulated carrier signal parts;

summing the attenuated one of the quaternary phase shift keying modulated phase modulated carrier signal parts with each other quaternary phase shift keying modulated phase modulated carrier signal part, wherein the summing produces a pre-distorted QAM modulation for at least one input symbol that compensates for amplitude compression due to amplifier nonlinear distortion.

31. A predistorted 12/4 Quadrature Amplitude Modulation (QAM) modulator comprising:

a mapping device mapping a modulator input bits to a plurality of nonreturn-to-zero (NRZ) modulator control bits, the mapping being determined by selected desired points on a 12/4 QAM constellation;

at least two quaternary phase shift keying (QPSK) modulators, each QPSK modulators receiving a portion of an input signal, each QPSK modulator receiving NRZ modulator control bits;

an attenuator, attenuating a first QPSK signal outputted from a first of the QPSK modulators;

a summer, adding the attenuated first QPSK modulated signal with a second QPSK modulated signal, the second QPSK modulated signal being outputted from a second of the QPSK modulator;

a first phase shift device, the first phase shift device receiving an output signal from the summer and at least one of the plurality of NRZ modulator control bits; and a second phase shift device, the second phase shift device receiving an output signal from the first phase shift device and at least one of the plurality of NRZ modulator control bits, the second phase shift device outputting a predistorted 12/4 QAM signal, wherein the plurality of modulator control bits control the first phase shift device, the second phase shift device, and the two QPSK modulators to achieve the desired points on the 12/4 QAM constellation.

32. A predistorted 12/4 Quadrature Amplitude Modulation (QAM) modulator comprising:

a mapping device mapping a modulator input bits to a plurality of nonreturn-to-zero (NRZ) modulator control bits, the mapping being determined by selected desired points on a 12/4 QAM constellation;

a first phase shift device, the first phase shift device receiving an input signal and at least one of the plurality of NRZ modulator control bits;

at least two quaternary phase shift keying (QPSK) modulators, the QPSK modulators receiving phase. shifted signals from the first phase shift device, each QPSK modulator receiving NRZ modulator control bits;

an attenuator, attenuating a first QPSK signal outputted from a first of the QPSK modulators;

a summer, adding the attenuated first QPSK modulated signal with a second QPSK modulated signal, the second QPSK modulated signal being outputted from a second of the QPSK modulator; and a second phase shift device, the second phase shift device receiving an output from the summer and at least one of the plurality of NRZ modulator control bits, the second phase shift device outputting a predistorted 12/4 QAM signal, wherein the plurality of modulator control bits control the first phase shift device, the second phase shift device, and the two QPSK modulators to achieve the desired points on the 12/4 QAM constellation.

33. A method for predistorted 12/4-Quadrature Amplitude Modulation (QAM) comprising:

selecting desired points on a 12/4 QAM constellation;

mapping an input signal to a plurality of modulator control bits, the mapping determined by the selected desired points;

phase shifting a continuous wave (CW) signal, the phase shifting being controlled by at least one of the plurality of modulator control bits;

splitting the phase shifted CW signal into a first phase shifted CW signal and a second phase shifted CW signal;

performing quaternary phase shift keying (QPSK) modulation on the first phase shifted CW signal and the second phase shifted CW signal, each QPSK controlled by two of the plurality of NRZ modulator control bits;

attenuating the first QPSK modulated CW signal; and summing the attenuated first QPSK modulated CW signal to the second QPSK modulated CW signal; and phase shifting the sum of the attenuated first QPSK modulated CW signal, the phase shifting being controlled by at least one of the plurality of modulator control bits, the phase shifting producing a predistorted 12/4-QAM signal with the desired points.

34. A method for predistorted 12/4-Quadrature Amplitude Modulation (QAM) comprising:

selecting desired points on a 12/4 QAM constellation;

mapping an input signal to a plurality of modulator control bits, the mapping determined by the selected desired points;

splitting a continuous wave (CW) signal into a first CW signal and a second CW signal;

performing quaternary phase shift keying (QPSK) modulation on the first CW signal and the second CW signal, each QPSK controlled by two of the plurality of modulator control bits;

attenuating the first QPSK modulated CW signal; and summing the attenuated first QPSK modulated CW signal to the second QPSK modulated CW signal; and phase shifting the sum of the attenuated first QPSK modulated CW signal and the second QPSK modulated CW signal, the phase shifting being controlled by at least one of the plurality of modulator control bits, the phase shifting producing a predistorted 12/4-QAM signal with the desired points.

* * * * *